Patented Dec. 5, 1950

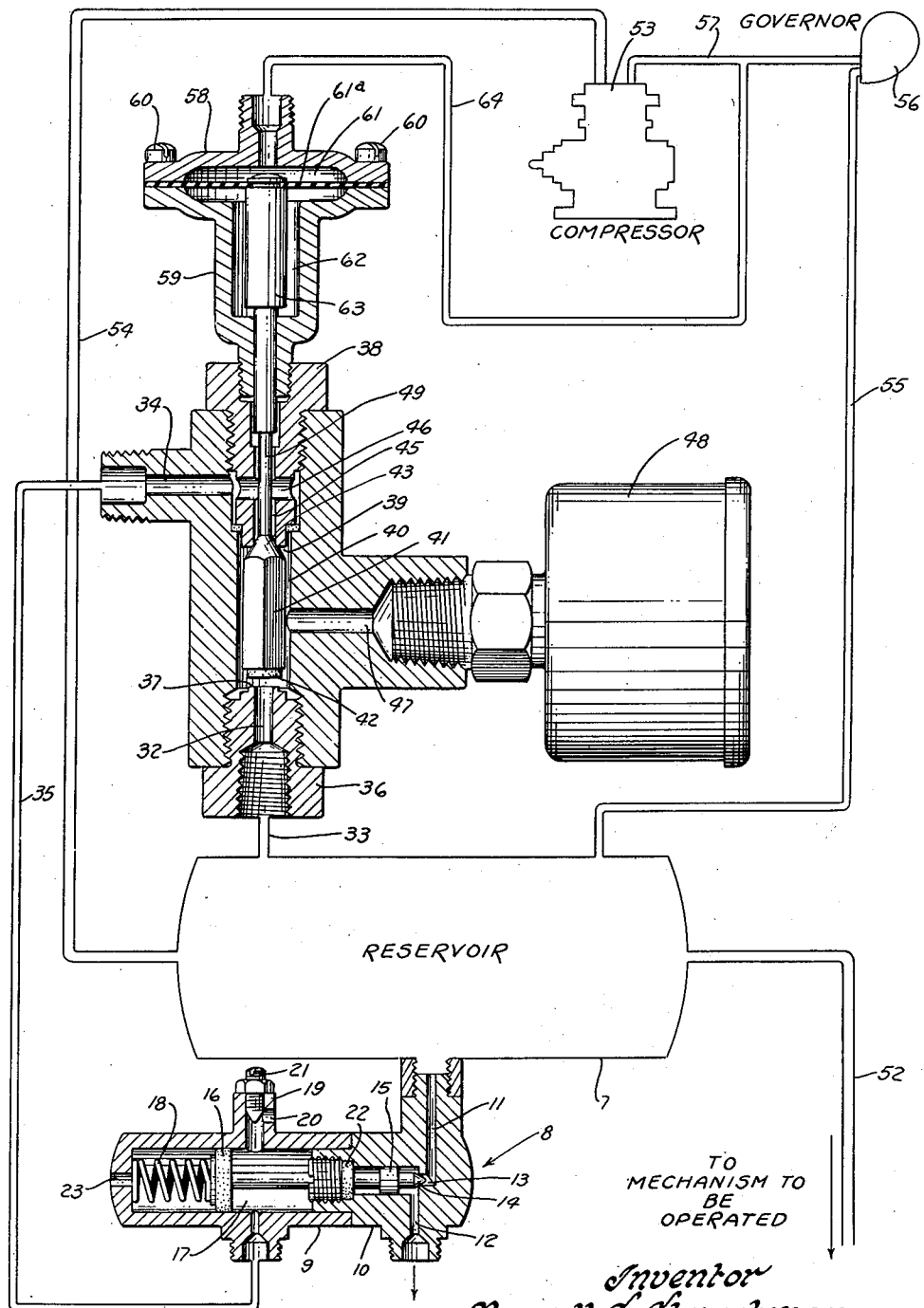

2,532,607

UNITED STATES PATENT OFFICE 2,532,607

VALVE USED AS A CONTROL

Russell C. Churchman, Des Moines, Iowa; Nellie Churchman executrix of said Russell C. Churchman, deceased Application December 29, 1947, Serial No. 794,387

2 Claims. (Cl. 230—1)

This invention relates to a valve structure and more particularly to a valve structure that is an improvement in an air compressor, storage tank combination that functions to provide air under pressure to another valve connected to the air storage tank to open the valve and allow accumulated moisture from the air storage tank to escape.

Present air compressors are mostly all operated by an electric motor with the air compressor connected to an air storage tank. Electric current is furnished to the compressor motor through an electric switch. The electric switch is connected to the air storage tank and the switch is closed, allowing electric current to flow to the compressor motor, when the pressure of the air in the storage tank falls to a pre-determined low value. The switch is held closed and the air compressor operated until the air pressure in the storage tank reaches a predetermined high value, when the switch is opened and the air compressor stopped.

In other compressor installations, the compressor runs continuously, as with compressors on trucks or with big compressor units that require a large starting torque where it is more economical to allow the electric motor to run continuously. When the compressor puts pressure on the air in the air storage tank to the predetermined high value, valves in the compression cylinders of the compressor open and while the pistons operate in the cylinder, the cylinders are open to the atmosphere hence no compression of air takes place.

In applicant's previous application, Serial No. 625,225 filed October 29, 1945, the problem of draining accumulated moisture, that results from compressing air, from an air storage tank is discussed and a solution offered and applicant's application Serial No. 651,261 filed March 1, 1946 now Patent 2,505,663, April 25, 1950 shows a valve member to be attached to a storage tank through which the accumulated moisture may drain. The present invention deals with a new and improved means in the form of a second valve to provide air under pressure to operate the valve connected to the air storage tank.

It is an object of the invention, among other, to provide new and improved valve wherein a pressure medium enters the valve and is stored in a reservoir when the outlet from the valve is closed and the inlet open; and the stored air from the reservoir released when the outlet is open and the inlet closed.

It is a further object of the invention to provide new and improved valves for an air compressor-storage tank combination wherein air under pressure enters the valve and is stored in a reservoir when the air compressor is not in operation; and each time the air compressor starts into operation the inlet to the valve is closed and the outlet opened so the stored air from the reservoir may be released to actuate another valve connected to the air storage tank to drain accumulated moisture therefrom.

It is still a further object of the invention to provide a new and improved valve for an air compressor-storage tank combination that will function to actuate a valve connected to the air storage tank to drain accumulated moisture therefrom that will function on any type of air compressor-storage tank combination, so long as the air compressor-storage tank combination starts and stops intermittently.

It is still a further object of the invention to provide new and improved valve means that will operate with an air compressor-storage tank combination, whether the air compressor be intermittent or continuous operation to actuate a valve connected to the air storage tank to drain accumulated moisture therefrom.

It is still a further object of the invention to provide a valve simple in construction and operation; economical in construction and operation, long lasting in operation; and economical to purchase.

With the foregoing and other objects in view, the invention will be more fully described herewith and will be particularly pointed out in the claims appended hereto.

In the drawings, wherein like symbols refer to like or corresponding parts throughout the several views:

The figure shows the valve member partly in elevation and partly in cross-section and further shows a diagrammatic view of the organization into which the valve is placed.

The figure shows the new and improved valve with actuation means so as to be adaptable for continuously operating compressor units.

A compressor 53 operates continuously and delivers air under pressure to storage tank 7 through a conduit 54 when the pressure in storage tank 7 has reached the predetermined low pressure. Air storage tank 7 connects through conduit 55 with a governor means 56. When the predetermined low pressure is reached in storage tank 7, governor 56 opens to allow air under pressure from storage tank 7 to flow to compressor 53 through conduit 57. The air under pressure from conduit 57 acts to close valves (not shown) in the compressor 53 cylinders so the compressor 53 now acts to compress air in the well known manner for compressors of this type and deliver the air through conduit 54 to the storage tank 7. When the air in storage tank 7 reaches the predetermined high value, the governor 56 acts to close off flow to conduit 57, hence air under pressure no longer flows to compressor 53 and the compressor cylinders are again opened and no air compressed.

A housing member, made of sections 58 and 59 attached together by bolts 60, has a diaphragm 61a between the sections 58 and 59. The diaphragm 61a is held between the two sections 58 and 59 and divides the housing into two chambers 61 and 62. The section 59 is screw threaded into thimble 38 of the new and improved valve. The diaphragm 58 has a rod 63 attached thereto and extending into the chamber 62, through the end of the housing 59 and into the thimble 38 to contact the end portion 49 of the valve stem. The housing 58 has a conduit 64 connecting thereto and in communication with chamber 61. The conduit 64 has its other end connecting into the conduit 57 between the compressor 53 and governor 56.

In operation when governor 56 remains closed, no air under pressure from storage tank 7 passes to the conduits 57 and 64 and hence to chamber 61. The parts of the organization are in the position shown in Figure 2 when the compressor 53 is not compressing air, with the inlet 32 to the valve open and the outlet 34 closed. Air under pressure from the storage tank 7 can flow through conduit 33 to inlet 32, chamber 40 and to reservoir 48 until equilibrium is established. When the pressure in the storage tank 7 reaches the predetermined low pressure and governor 56 opens, compressor 53 is set into operation to bring the pressure in storage tank 7 up to the predetermined high value.

When this occurs, air under pressure from air storage tank 7 passes through conduit 55, governor 56, conduits 57 and 64 to chamber 61 in the housing 58. The air under pressure in chamber 61 exerts its pressure against the diaphragm 61a forcing diaphragm 61a to the right, hence forcing rod 63 attached to diaphragm 61a to the right. The rod 63 contacts the valve stem portion 49 moving it to the right. The conical portion 43 is moved off seat 39, just as in the species of Figure 1 and the sealing member 42 is moved into engagement with the seat 37 closing off the inlet 32. The air under pressure in reservoir 48 can now flow through passageway 47, passageways 40 and 45 to outlet 34 from where conduit 35 conducts the air under pressure to the chamber 17 of valve 8. The valve 8 operates exactly as it does in the species of Figure 1 with the valve 8 remaining open to drain moisture from the storage tank 7 any time interval desired.

The inlet 32 remains closed so long as compressor 53 operates. When the pressure in storage tank 7 reaches the predetermined high value and governor 56 closes, air under pressure is cut off from the chamber 61, hence the pressure of air from storage tank 7 moves valve stem 41 off seat 37 and in turn again seats conical portion 43 on the seat 39 closing off the outlet 34. The cycle of again letting reservoir 24 fill with air from storage tank 7 is repeated.

It will be understood that the invention has been described for purposes of illustration and explanation and that changes and variations are possible without departing from the scope of the invention; all such modifications and changes are intended to be included in the appended claims.

I claim:

1. In an air compressor wherein the compressor continuously operates but compresses air only when the air in a storage tank connected with the compressor reaches a predetermined low, a governor connected between the air storage tank and the compressor, said governor opening to allow air under pressure to flow to the compressor when the air in the storage tank reaches the predetermined low pressure, said air under pressure acting on the compressor placing the compressor into operation to compress air and deliver the compressed air to the air storage tank, said governor closing off flow of air under pressure to the compressor when the air under pressure in the storage tank reaches the predetermined high pressure, said air storage tank having a valve means opened by air under pressure connected therewith to drain accumulated moisture from the air storage tank each time the compressor is placed into operation, the improvement comprising a second valve structure having a valve housing with an inlet into the housing connected to the air storage tank and an outlet therefrom connected into the first mentioned valve, a chamber within the valve housing connecting the inlet and outlet, a valve stem within the chamber alternately closing the inlet and outlet, an air reservoir associated with the chamber, said valve stem being smaller than the chamber to form a passageway between the valve stem and chamber to the outlet from the air reservoir when the inlet is closed, and means associated with the second valve actuated by air under pressure from the air storage tank when the governor is open to contact the valve stem of the second valve to move the valve stem across the inlet and open the outlet.

2. In an air compressor wherein the compressor continuously operates but compresses air only when the air in a storage tank connected with the compressor reaches a predetermined low, a governor connected between the air storage tank and the compressor, said governor opening to allow air under pressure to flow to the compressor when the air in the storage tank reaches the predetermined low pressure, said air under pressure acting on the compressor placing the compressor into operation to compress air and deliver the compressed air to the air storage tank, said governor closing off low of air under pressure to the compressor when the air under pressure in the storage tank reaches the predetermined high pressure, said air storage tank having a valve means opened by air under pressure connected therewith to drain accumulated moisture from the air storage tank each time the compressor is placed into operation, the improvement comprising a second valve structure having a valve housing with an inlet into the housing connected to the air storage tank and an outlet therefrom connected into the first mentioned valve, a chamber within the valve housing connecting the inlet and outlet, a valve stem within the chamber alternately closing the inlet and outlet, an air reservoir associated with the chamber, said valve stem being smaller than the chamber to form a passageway between the valve stem and chamber to the outlet from the air reservoir when the inlet is closed and means associated with the second valve actuated by air under pressure and a housing member associated with the second valve, said housing divided by a diaphragm into two chambers, a rod attached to the diaphragm and contacting the valve stem of the second valve, air under pressure from the air storage tank entered into one chamber when the governor is open moving the diaphragm and rod forcing the valve stem into closed position across the inlet.

RUSSELL C. CHURCHMAN.

REFERENCES CITED

The following references are of record in the file of this patent:

UNITED STATES PATENTS

| Number | Name | Date |
|---|---|---|
| 2,128,206 | Hewitt | Aug. 23, 1938 |
| 2,256,565 | Mantle | Sept. 23, 1941 |
| 2,462,614 | De Witt | Feb. 22, 1949 |